(12) United States Patent
Chang et al.

(10) Patent No.: US 7,981,568 B2
(45) Date of Patent: Jul. 19, 2011

(54) ION CONDUCTIVE COMPOSITE MEMBRANE USING INORGANIC CONDUCTOR

(75) Inventors: Hyuk Chang, Seongnam-si (KR); Hae-kyoung Kim, Seoul (KR); Hasuck Kim, Seoul (KR); Jin-Kyu Lee, Seoul (KR); Sangook Park, Seoul (KR); Shin Woo Ha, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/021,588

(22) Filed: Feb. 4, 2011

(65) Prior Publication Data

US 2011/0123900 A1    May 26, 2011

Related U.S. Application Data

(62) Division of application No. 11/415,147, filed on May 2, 2006, now Pat. No. 7,883,820.

(30) Foreign Application Priority Data

Jul. 12, 2005    (KR) .................. 10-2005-0062927

(51) Int. Cl.
*H01M 8/10* (2006.01)
*H01M 8/02* (2006.01)
*B01J 20/28* (2006.01)

(52) U.S. Cl. .............. 429/492; 429/491; 521/27; 502/4; 502/214

(58) Field of Classification Search .................. None
See application file for complete search history.

(56) References Cited

U.S. PATENT DOCUMENTS

| 5,188,768 | A | 2/1993 | Sotomura |
| 5,849,428 | A | 12/1998 | Hamlen |
| 5,919,583 | A | 7/1999 | Grot et al. |
| 6,630,265 | B1 | 10/2003 | Taft, III et al. |
| 7,029,559 | B2 | 4/2006 | Won et al. |
| 7,883,820 | B2 * | 2/2011 | Chang et al. .......... 429/492 |
| 2007/0015022 | A1 | 1/2007 | Chang et al. |

FOREIGN PATENT DOCUMENTS

| CN | 200610092872.0 | 4/2006 |
| JP | 2003-157863 A | 5/2003 |
| JP | 2003-175340 A | 6/2003 |
| JP | 2004-055181 A | 2/2004 |
| JP | 2004-135328 A | 4/2004 |
| JP | 2005-005047 A | 1/2005 |
| WO | WO 2004/096903 A1 | 11/2004 |

* cited by examiner

*Primary Examiner* — John S Maples
(74) *Attorney, Agent, or Firm* — Lee & Morse, P.C.

(57) ABSTRACT

An ion-conductive composite membrane and a method of manufacturing the same, the membrane including phosphate platelets, a silicon compound, and a Keggin-type oxometalate and/or Keggin-type heteropoly acid, wherein the phosphate platelets are three-dimensionally connected to each other via the silicon compound. An electrolyte membrane having an ion-conductive inorganic membrane or an ion-conductive organic/inorganic composite membrane effectively prevents crossover of liquid fuel without the reduction of ion conductivity in a liquid fuel cell, thereby allowing for the production of fuel cells having excellent performance.

15 Claims, 4 Drawing Sheets

ION CONDUCTIVE COMPOSITE MEMBRANE USING INORGANIC CONDUCTOR

CROSS REFERENCE TO RELATED APPLICATION

This is a divisional application based on application Ser. No. 11/415,147, filed May 2, 2006, now U.S. Pat. No. 7,883,820, the entire contents of which is hereby incorporated by reference.

This application claims the benefit of Korean Patent Application No. 2005-62927, filed on Jul. 12, 2005, in the Korean Intellectual Property Office, the disclosure of which is incorporated herein in its entirety by reference.

BACKGROUND OF THE INVENTION

1. Field of the Invention

An aspect of the present invention relates to an ion-conductive composite membrane and a method of manufacturing the same, and more particularly, to an ion-conductive composite membrane that effectively prevents crossover of liquid fuel without the reduction of ion conductivity in a fuel cell and a method of manufacturing the same.

2. Description of the Related Art

A group of fuel cells form an electro-chemical apparatus in which chemical reaction energy between oxygen and hydrogen contained in a hydrocarbon-based material, such as methanol, ethanol, or natural gas, is directly converted into electrical energy. Since the energy conversion process of fuel cells is very efficient and environmentally friendly, various fuel cells have been researched.

Fuel cells can be categorized into phosphoric acid type fuel cells (PAFC), molten carbonate type fuel cells (MCFC), solid oxide type fuel cells (SOFC), polymer electrolyte membrane fuel cells (PEMFC), alkali type fuel cells (AFC), and the like, according to the electrolyte that is used. These fuel cells operate based on the same principle, but have different fuels, different operating temperatures, different catalysts, different electrolytes, etc. The PEMFC is effective for use in small stationary electric power plants and transportation systems because the PEMFC has several advantages such as low temperature operation, high output density, rapid start-up, and quick response for the change of output requirement.

The main portion of a PEMFC is a membrane electrode assembly (MEA). A MEA typically includes a polymer electrolyte membrane and two electrodes attached to opposite sides of the polymer electrolyte membrane and respectively acting as a cathode and anode.

The polymer electrolyte membrane functions as a separation membrane preventing the direct contact of oxidizers and reducing agents, an electric insulation between the two electrodes, and a proton conducting medium. Accordingly, the polymer electrolyte membrane is required to have high proton conductivity, high electric insulation, low reactant permeability, high thermal, chemical, and mechanical stability in operating conditions of fuel cells, and low costs.

To satisfy these requirements, various polymer electrolyte membranes have been developed. Perfluoropolysulfonic acid membranes such as a NAFION membrane are widely used because of their good durability and performance. However, sufficient moisture should be supplied to properly operate the NAFION membrane and the operating temperature should be lower than 80° C. to prevent moisture from being lost. In addition, carbon-carbon bonds in a backbone in the NAFION membrane may be attacked by oxygen ($O_2$) making the bonds unstable in operating conditions of fuel cells.

In the case of DMFCs, a methanol solution is supplied to an anode as fuel, and thus some of the unreacted methanol permeates into a polymer electrolyte membrane of the DMFC. The permeation of the methanol into the polymer electrolyte membrane causes the electrolyte membrane to swell and the methanol diffuses to a cathode catalyst layer. This is referred to as 'methanol crossover'. Accordingly, since the methanol is directly oxidized at a cathode at which electro-chemical reduction of protons and oxygen occurs, the potential of the cathode decreases significantly thereby degrading the performance of the fuel cells.

Such a problem commonly occurs in other fuel cells using liquid fuel containing polar organic fuel.

Prevention of the crossover of polar organic liquid fuel such as methanol or ethanol has been actively researched. For example, inorganic fillers were dispersed in a polymer electrolyte matrix to obtain a membrane (U.S. Pat. Nos. 5,919,583 and 5,849,428) or an inorganic cation-exchange material was mixed with NAFION to form a organic/inorganic composite membrane (U.S. Pat. No. 6,630,265). For this purpose, the development of nano composite materials and the formation of an exfoliated layer of an inorganic material in polymers have been actively researched.

In the development of the nano composite materials, an inorganic material having proton conductivity is obtained from clay and exfoliated using polymers, or polymers are intercalated into gaps. This approach has brought about many improvements, but has not completely prevented the crossover of the polar organic liquid fuel.

An exfoliated layer of an inorganic material is formed by adding ion conductivity to an exfoliated inorganic material and coating the same on a base material. However, this method cannot completely prevent the crossover of the polar organic liquid fuel, and essentially requires the base material.

SUMMARY OF THE INVENTION

An aspect of the present invention provides an ion-conductive inorganic membrane that effectively prevents crossover of liquid fuel without the reduction of ion conductivity.

Another aspect of the present invention provides an ion-conductive organic/inorganic composite membrane that effectively prevents crossover of liquid fuel without the reduction of ion conductivity and has high mechanical strength.

Another aspect of the present invention provides a method of manufacturing the ion-conductive inorganic membrane.

Another aspect of the present invention provides a method of manufacturing the ion-conductive organic/inorganic composite membrane.

Another aspect of the present invention provides a membrane electrode assembly including the ion-conductive inorganic membrane or the ion-conductive organic/inorganic composite membrane.

Another aspect of the present invention provides a fuel cell including the ion-conductive inorganic membrane or the ion-conductive organic/inorganic composite membrane.

According to another aspect of the present invention, there is provided an ion-conductive inorganic membrane including: phosphate platelets; at least one silicon compound selected from the group consisting of silicate, siloxane, and silane; and a Keggin type polyoxometalate aor a Keggin-type heteropoly acid, wherein the phosphate platelets are three-dimensionally connected to each other via the at least one silicon compound.

According to another aspect of the present invention, there is provided an ion-conductive organic/inorganic composite membrane including: a porous base material; and an ion-conductive inorganic material which includes phosphate platelets, at least one silicon compound selected from the group consisting of silicate, siloxane, and silane, and a Keggin-type polyoxometalate or a Keggin-type heteropoly acid, wherein the phosphate platelets are three-dimensionally connected to each other via the at least one silicon compound, wherein the ion-conductive inorganic material is coated on a surface of the porous base material or impregnated throughout the entire porous base material.

According to another aspect of the present invention, there is provided a method of manufacturing an ion-conductive inorganic membrane including: mixing 100 parts by weight of phosphate platelet, 20 through 250 parts by weight of at least one silicon compound selected from the group consisting of silicate, siloxane, and silane, 0.1 through 10 parts by weight of a Keggin-type polyoxometalate or a Keggin-type heteropoly acid, and 10 through 30 parts by weight of acid to form a gel mixture; applying the gel mixture onto a substrate and drying the gel mixture applied on the substrate; and removing the substrate.

According to another aspect of the present invention, there is provided a membrane electrode assembly (MEA) that includes a cathode having a catalyst layer and a diffusion layer, an anode having a catalyst layer and a diffusion layer, and an electrolyte membrane disposed between the cathode and the anode, wherein the electrolyte membrane includes the ion-conductive inorganic membrane or the ion-conductive organic/inorganic composite membrane.

According to another aspect of the present invention, there is provided a fuel cell that includes a cathode having a catalyst layer and a diffusion layer, an anode having a catalyst layer and a diffusion layer, and an electrolyte membrane disposed between the cathode and the anode, wherein the electrolyte membrane includes the ion-conductive inorganic membrane or the ion-conductive organic/inorganic composite membrane.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
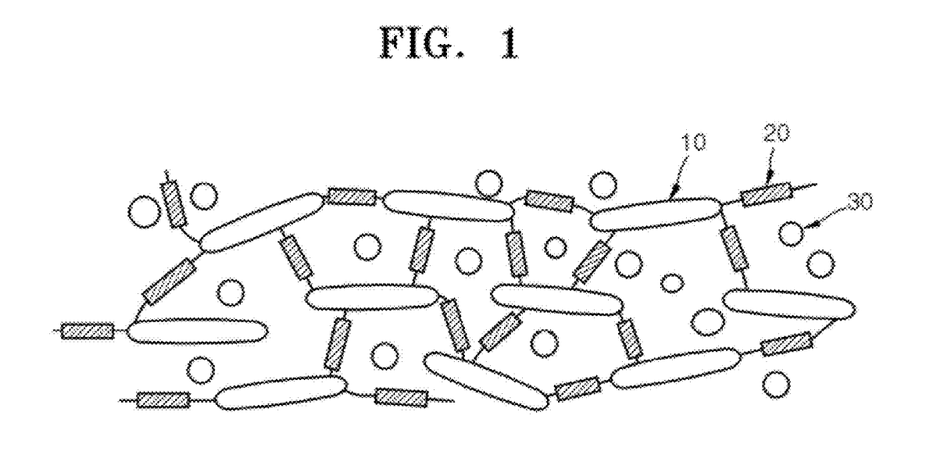
FIG. 1 is a schematic conceptual diagram of an ion-conductive membrane according to an embodiment of the present invention.

FIG. 1 is a schematic conceptual diagram of an ion-conductive membrane according to an embodiment of the present invention. The ion-conductive inorganic membrane includes: phosphate platelets 10; at least one silicon compound 20 selected from the group consisting of silicate, siloxane, and silane; and Keggin-type polyoxometalate 30 and/or Keggin-type heteropoly acid 30, wherein the phosphate platelets 10 are three-dimensionally connected to each other via the at least one silicon compound 20.

In the ion-conductive inorganic membrane according to an embodiment of the present invention illustrated in FIG. 1, the phosphate platelets 10 are three-dimensionally connected to each other via the at least one silicon compound 20, and a plurality of Keggin-type polyoxometalates 30 and/or Keggin-type heteropoly acids 30 are dispersed in the structure.

The phosphate platelets 10 may be α-zirconium phosphate, clay, or graphite oxide, but preferably α-zirconium phosphate. However, the phosphate platelets 10 are not limited to these platelets.

The phosphate platelets 10 are ion conductive and prevent the permeation of liquid molecules such as water or methanol. The phosphate platelets 10 can be stacked in order to prevent the permeation of methanol.

However, when only phosphate platelets 10 are employed, liquid such as water or methanol permeates through the gaps between the phosphate platelet particles. Thus, the phosphate platelets 10 at most retard the permeation of methanol and reduce the amounts of methanol, but cannot effectively prevent methanol crossover.

In the ion-conductive inorganic membrane according to an embodiment of the present invention, the phosphate platelets 10 are three-dimensionally densely connected to each other using the at least one silicon compound 20 so that methanol molecules and/or water molecules cannot permeate into the gaps between the phosphate platelets 10.

The phosphate platelets 10 are exfoliated and may have thicknesses of 0.5 through 10 nm. When the thickness of the phosphate platelets 10 is less than 0.5 nm, the mechanical strength thereof is weak. When the thickness of the phosphate platelets 10 is greater than 10 nm, the dispersion thereof becomes lower so that the prevention of the liquid fuel crossover is reduced.

The at least one silicon compound 20 to connect the phosphate platelets 10 is, for example, colloidal silica, polydimethylsiloxane (PDMS), alkoxysilane, chlorosilane, or a combination thereof.

The at least one silicon compound 20 includes silicate and alkoxysilane having an organic functional group such as silicate ester. The silicate having the organic functional group may be colloidal silica, for example, LUDOX available from Aldrich Fine Chemicals Co. The at least one silicon compound 20 is, for example, tetraethylorthosilicate (TEOS), tetramethylorthosilicate (TMOS), 1,2-bis(trimethoxysilyl)ethane, octyltrimethoxysilane, tetraethyl silicate, tetraisopropyl silicate, tetramethyl silicate, tetramethoxysilane, tetraethoxysilane, tetraisopropoxysilane, propyltrimethoxysilane, ethyltrimethoxysilane, methyltrimethoxysilane, methyltriethoxysilane, aminoalkoxysilane, silicontetrachloride ($SiCl_4$), trichloro(dichloromethyl)silane ($Cl_2CHSiCl_3$), trichloro(hexyl)silane ($CH_3(CH_2)_5SiCl_3$), trichloro(isobutyl)silane (($CH_3)_2CHCH_2SiCl_3$), trichloro(octadecyl)silane ($CH_3(CH_2)_{17}SiCl_3$), trichlorooctylsilane, trichloro(phenethyl)silane ($C_6H_5CH_2CH_2SiCl_3$), trichloro(phenyl)silane, trichloro(propyl)silane, trichloro(methyl)silane, trichloro(chloromethyl)silane, dichloro(dimethyl)silane, isobutyl(trimethoxy)silane, and a combination thereof, but the present invention is not limited thereto.

The weight ratio of the phosphate platelets 10 to the at least one silicon compound 20 may be 1:0.2 through 1:2.5. When the amount of the at least one silicon compound 20 is smaller than the minimum of the range, the formation of a network becomes weak so that the prevention of the permeation of the liquid fuel and the mechanical strength of the membrane are reduced. When the amount of the at least one silicon compound 20 is larger than the maximum of the range, the ion conductivity decreases because of the relative reduction of the portion having ion conductivity or the phase separation.

Since the phosphate platelets 10 in the present membrane have weaker ion conductivity than other polymer electrolyte membranes, ion-conductive materials are added. The ion-conductive material is Keggin-type polyoxometalate 30 and/or Keggin-type heteropoly acid 30.

The polyoxometalate 30 and the heteropoly acid 30 have a negatively charged polyhedral cage structure, and are electrically neutralized with cations outside of the polyhedral cage structure. In the polyhedral cage structure, a central atom is disposed in the polyhedral cage structure, and the polyhedral cage structure includes a plurality of metal atoms, the same or different, bonded to oxygen atoms.

When at least one of the cations disposed outside of the polyhedral cage structure is a proton, the compound is referred to as a heteropoly acid. When the cation is not a proton but an alkali metal ion or an ammonium ion, the compound is referred to as a polyoxometalate.

The heteropoly acid 30 and the polyoxometalate 30 have various structures, for example, Keggin structure, Dawson and Anderson structure. These structures are determined according to geometrical structure of predetermined heteropoly acid 30 compositions, and are changed according to atomic radii of metal atoms present and coordination chemistry. In an embodiment of the present invention, the heteropoly acid 30 and polyoxometalate 30 have the Keggin structure.

The Keggin-type heteropoly acid 30 may be one selected from the group consisting of $H_4SiW_{12}O_{40}$, $H_4SiMo_{12}O_{40}$, $H_5SiVMo_{11}O_{40}$, $H_6SiV_2Mo_{10}O_{40}$, $H_7SiV_3Mo_9O_{40}$, $H_3PMo_{12}O_{40}$, $H_3PW_{12}O_{40}$, $(VO)_{1.5}PMo_{12}O_{40}$, $(VO)_{1.5}PW_{12}O_{40}$, $(TiO)_{1.5}PMo_{12}O_{40}$, $H(VO)PMo_{12}O_{40}$, $H(VO)PW_{12}O_{40}$, $H_6PV_3Mo_9O_{40}$, $H_5PV_2Mo_{10}O_{40}$, $H_5PV_2W_{10}O_{40}$, $H_6PV_3W_9O_{40}$, $H_4PV_2Mo_{11}O_{40}$, $H_4PVW_{11}O_{40}$, $RhPMo_{12}O_{40}$, $BiPMo_{12}O_{40}$, $HCrPVMo_{11}O_{40}$, $HBiPVMo_{11}O_{40}$, and a combination thereof, but the present invention is not limited thereto.

In addition, the Keggin-type polyoxometalate 30 may be a salt formed by substituting protons in the heteropoly acid 30 with alkali metal ions or ammonium ions. The alkali metal ions may be, for example, lithium ions, sodium ions, potassium ions, or cesium ions, but the embodiment of the present invention is not limited thereto.

The weight ratio of the phosphate platelets 10 to the Keggin-type polyoxometalate 30 and/or the Keggin-type heteropoly acid 30 may be 1000:1 through 1:1. When the amount of the Keggin-type polyoxometalate 30 and/or the Keggin-type heteropoly acid 30 is smaller than the minimum of the range, ion conductivity is deteriorated. When the amount of the Keggin-type polyoxometalate 30 and/or the Keggin-type heteropoly acid 30 is larger than the maximum of the range, the prevention of the permeation of the liquid fuel is reduced.

The thickness of the ion-conductive inorganic membrane is 1 through 20 µm. When the thickness of the ion-conductive inorganic membrane is less than 1 µm, the mechanical strength thereof decreases. When the thickness of the ion-conductive inorganic membrane is greater than 20 µm, the electric resistance thereof increases and the entire volume of the fuel cell increases.

Hereinafter, an ion-conductive organic/inorganic composite membrane according to an embodiment of the present invention will be described in detail.

The ion-conductive organic/inorganic composite membrane according to the current embodiment of the present invention includes a porous base material and an ion-conductive inorganic material. The ion-conductive inorganic material includes phosphate platelets 10; at least one silicon compound 20 selected from the group consisting of silicate, siloxane, and silane; and Keggin-type polyoxometalate 30 and/or Keggin-type heteropoly acid 30. The phosphate platelets 10 are three-dimensionally connected to each other by the at least one silicon compound 20. The ion-conductive inorganic material is coated on the surface of the porous base material or impregnated throughout the entire porous base material.

The above-described ion-conductive inorganic membrane according to the previous embodiment of the present invention does not include a base material and the ion-conductive inorganic material itself stands alone. The ion-conductive organic/inorganic composite membrane according to the current embodiment of the present invention includes a porous base material and an ion-conductive inorganic material coated onto or impregnated into the porous base material.

In the ion-conductive organic/inorganic composite membrane according to the current embodiment of the present invention, the weight ratios of the phosphate platelets 10; the at least one silicon compound 20 selected from the group consisting of silicate, siloxane, and silane; and the Keggin-type polyoxometalate 30 and/or the Keggin-type heteropoly acid 30 are the same as the weight ratios of the ion-conductive inorganic membrane. In addition, the phosphate platelets 10; the at least one silicon compound 20; and the Keggin-type polyoxometalate 30 and/or the Keggin-type heteropoly acid 30 are the same as the ion-conductive inorganic membrane described above.

The porous base material is not specifically limited to the examples described above, and any porous base material may be used as long as it is porous and has enough mechanical properties and thermal resistance to be used as an electrolyte membrane. The porous base material may be a polymer resin, for example, polyvinyl alcohol, polyacrylonitrile, phenol resin, fluoropolymer-based resin, cellulose-based resin, or nylon resin.

Among them, ion-conductive materials can be used when coating an ion-conductive inorganic material on the surface of the porous base material and when impregnating ion-conductive inorganic material into the porous base material.

The polymer-based resin may be a polymer having a cation exchange group. The cation exchange group may be, for example, sulfonic acid group, carboxyl group, phosphoric acid group, imide group, sulfonimide group, sulfonamide group, or hydroxy group.

The polymer having a cation exchange group may be homopolymers or copolymer of trifluoroethylene, tetrafluoroethylene, hexafluoropropylene (H FP), styrene-divinyl benzene, α,β,β-trifluorostyrene, styrene, imide, sulfone, phosphazene, etherether ketone, ethylene oxide, polyvinylidenefluoride (PVdF), polyphenylene sulfide, or aromatic group, and derivatives thereof. The polymer can be used in combination or alone.

The polymer having the cation exchange group may be a highly fluorinated polymer in which 90% of the total of fluorine atoms and hydrogen atoms bonded to carbon atoms in main chains and side chains of the polymer is fluorine atom.

The polymer having the cation exchange group includes sulfonate as the cation exchange group at one end of the side chain, and may be a highly fluorinated polymer having the sulfonate group in which 90% of the total of fluorine atoms and hydrogen atoms bonded to carbon atoms in main chains and side chains of the polymer is fluorine atom.

The average diameter of pores formed in the porous base material may be 0.05 through 10 µm. When the average diameter of the pores is less than 0.05 µm, an inorganic material cannot be uniformly dispersed and distributed in and on the porous base material. When the average diameter of the pores is greater than 10 µm, the prevention of the crossover of the liquid fuel is reduced.

The ion-conductive inorganic material may be coated on or impregnated into the porous base material. When the ion-conductive inorganic material is impregnated, a thin ion-conductive inorganic material layer is formed on the surface of the porous base material.

The thickness of the ion-conductive inorganic material layer formed on the porous base material may be 0.2 through 10 µm. When the thickness of the ion-conductive inorganic material layer is less than 0.2 µm, the prevention of the permeation of the liquid fuel is reduced. When the thickness of the ion-conductive inorganic material layer is greater than 10 µm, the ion conductivity may decrease.

The thickness of the ion-conductive organic/inorganic composite membrane may be 50 through 200 µm. When the thickness of the ion-conductive organic/inorganic composite membrane is less than 50 µm, the mechanical strength thereof is insufficient. When the thickness of ion-conductive organic/inorganic composite membrane is greater than 200 µm, the entire volume of the fuel cell increases and the ion conductivity thereof decreases.

Hereinafter, a method of manufacturing the ion-conductive inorganic membrane according to an embodiment of the present invention will be described in detail.

100 parts by weight of phosphate platelet, 20 through 250 parts by weight of at least one silicon compound selected from the group consisting of silicate, siloxane, and silane, 0.1 through 10 parts by weight of Keggin-type polyoxometalate and/or Keggin-type heteropoly acid, and 10 through 30 parts by weight of an acid is mixed to form a gel type mixture.

The acid acts as a catalyst in a reaction that converts the mixture into a gel mixture, and may be sulfuric acid, nitric acid, hydrochloric acid, or phosphoric acid, and preferably nitric acid. The concentration of the acid may be 0.1 through 10.0 M. When the concentration of the acid is less than 0.1 M, the acid cannot properly act as a catalyst. When concentration of the acid is greater than 10 M, a gel mixture cannot be properly formed.

The mixing temperature for the gelation may be from 30 to 80° C. When the mixing temperature is lower than 30° C., the reaction is so slow that the reaction time is too long. When the mixing temperature is higher than 80° C., the reaction rate is too fast that a desired shape may not be obtained and phase separation may occur.

The gel mixture is applied onto a substrate and dried. The method of uniformly applying the gel mixture onto a substrate may be a well-known method to those of ordinary skill in the art, and thus the present invention is not limited thereto. Specifically, spin-coating, spray-coating, roll-coating, dip-coating, or knife-coating may be employed.

The substrate may be formed of a material having a smooth surface, for example, glass or quartz. To easily separate the ion-conductive inorganic membrane and the substrate, a substrate on which a release agent is applied in advance may be used.

After the ion-conductive inorganic membrane is sufficiently dried and solidified, the ion-conductive inorganic membrane may be peeled off from the surface of the substrate, thereby forming the ion-conductive inorganic membrane.

Hereinafter, a method of manufacturing the ion-conductive organic/inorganic composite membrane according to an embodiment of the present invention will be described in detail.

A gel mixture is manufactured using the same method as in manufacturing the ion-conductive inorganic membrane. The composition of the acid acting as a catalyst and conditions for forming the gel mixture are the same as in the manufacture of the ion-conductive inorganic membrane.

The gel mixture may be coated onto or impregnated into a porous base material.

The method of uniformly applying the gel mixture onto the porous base material may be a well-known method to those of ordinary skill in the art, and thus the present invention is not limited thereto. Specifically, spin-coating, spray-coating, roll-coating, dip-coating, or knife-coating may be employed.

The method of impregnating the gel mixture into the porous base material may be a well-known method to those of ordinary skill in the art, and thus the present invention is not limited thereto. Specifically, the porous base material may be immersed in the gel mixture. The immersion time may be 5 through 120 hours. When the immersion time is shorter than 5 hours, the gel mixture is not sufficiently dispersed into the porous base material so that prevention of the permeation of the liquid fuel is not sufficient. When the immersion time is longer than 120 hours, the effect of immersion is already saturated and it is not economical.

Hereinafter, a membrane electrode assembly (MEA) including the ion-conductive inorganic membrane or the ion-conductive organic/inorganic composite membrane, according to an embodiment of the present invention will be described in detail.

The MEA according to an embodiment of the present invention includes a cathode having a catalyst layer and a diffusion layer, an anode having a catalyst layer and a diffusion layer, and an electrolyte membrane disposed between the cathode and the anode, wherein the electrolyte membrane includes the ion-conductive inorganic membrane or the ion-conductive organic/inorganic composite membrane of an embodiment of the present invention.

The cathode and anode including a catalyst layer and a diffusion layer may be well known to those of ordinary skill in the art. In addition, the electrolyte membrane includes the ion-conductive inorganic membrane or the ion-conductive organic/inorganic composite membrane according to an embodiment of the present invention. The ion-conductive inorganic membrane or the ion-conductive organic/inorganic composite membrane according to the embodiments of the present invention may be solely used as an electrolyte membrane, or may be combined with other ion-conductive membranes.

Hereinafter, a fuel cell including the ion-conductive inorganic membrane or the ion-conductive organic/inorganic composite membrane of the present invention, according to an embodiment of the present invention will be described in detail.

The fuel cell according to an embodiment of the present invention includes a cathode having a catalyst layer and a diffusion layer, an anode having a catalyst layer and a diffusion layer, and an electrolyte membrane disposed between the cathode and the anode, wherein the electrolyte membrane includes the ion-conductive inorganic membrane or the ion-conductive organic/inorganic composite membrane according to an embodiment of the present invention.

The cathode and anode including the catalyst layer and the diffusion layer may be well known to those of ordinary skill in the art of the fuel cell. The electrolyte membrane includes the ion-conductive inorganic membrane or the ion-conductive organic/inorganic composite membrane according to an embodiment of the present invention. The ion-conductive inorganic membrane or ion-conductive organic/inorganic composite membrane according to an embodiment of the present invention may be used as an electrolyte membrane alone or in combination with other ion-conductive membranes.

The fuel cell according to an embodiment of the present invention can be manufactured using conventional methods, and thus detailed descriptions thereof are omitted.

An embodiment of the present invention will be explained in detail with reference to the following examples. The following examples are for illustrative purposes and are not intended to limit the scope of the invention.

Examples 1 through 3

5 g of exfoliated phosphate platelet, 5 g of TEOS, and 0.05 g of $Na_3PW_{12}O_{40} \cdot xH_2O$ as a polyoxometalate were mixed, and then 0.5 ml of 1.0 M nitric acid was added thereto, thereby forming a gel mixture at 50° C.

Figure 2A:
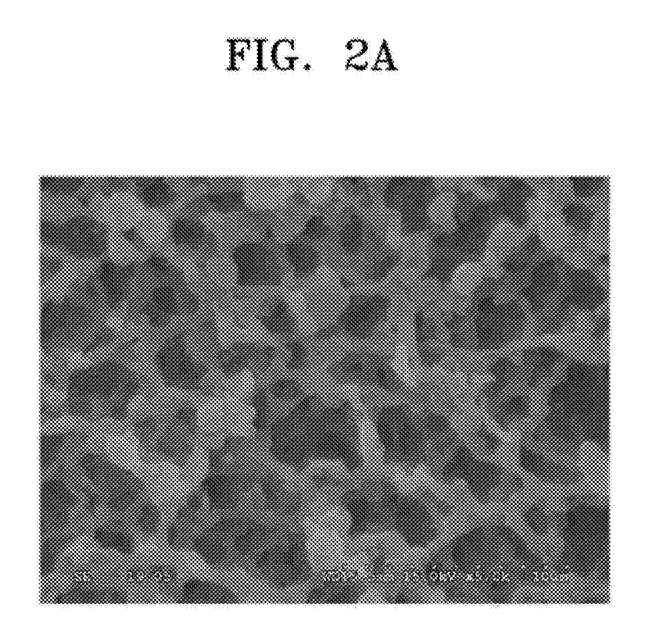
FIGS. 2A and 2B are scanning electron spectroscopy (SEM) images illustrating porous base materials used in manufacturing ion-conductive organic/inorganic composite membranes of Examples 1 through 3 and Examples 4 through 6, respectively, according to an embodiment of the present invention.

Mixed cellulose ester (see FIG. 2A) was used as a porous base material. The pore size of the porous base material was 3 μm, and the thickness thereof was 110 μm.

The gel mixture was repeatedly spin-coated on the porous base material so that coating layers respectively having thicknesses of 1, 3, 5 μm were formed, thereby forming an ion-conductive organic/inorganic composite membrane. The spin-coating was performed at 1000 RPM for 10 seconds.

Figure 3:
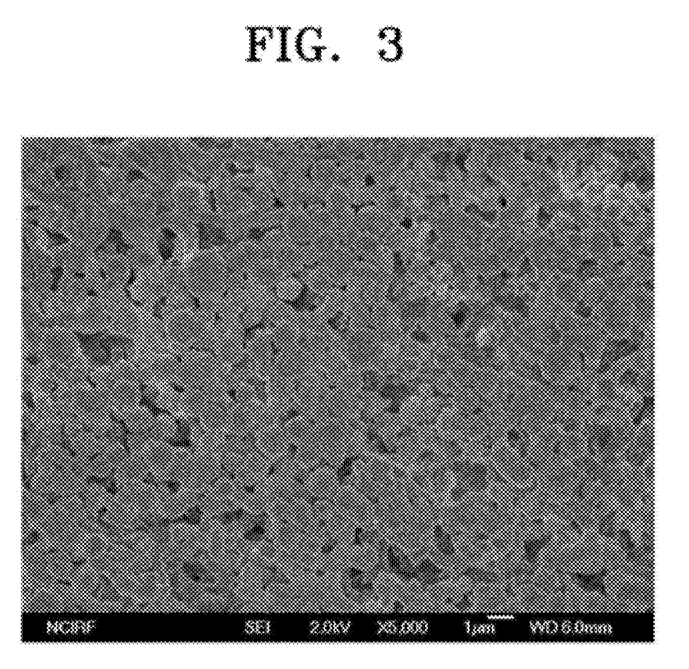
FIG. 3 is a SEM image illustrating a surface of the ion-conductive organic/inorganic composite membrane manufactured in Example 2.

FIG. 3 is a scanning electron spectroscopy (SEM) image of a surface of an ion-conductive organic/inorganic composite membrane of Example 2.

Examples 4 through 6

5 g of exfoliated phosphate platelet, 5 g of TEOS, and 0.05 g of $Na_3PW_{12}O_{40} \cdot xH_2O$ as a polyoxometalate were mixed, and then 0.5 ml of 1.0 M nitric acid was added thereto, thereby forming a gel mixture at 50° C.

Figure 2B:
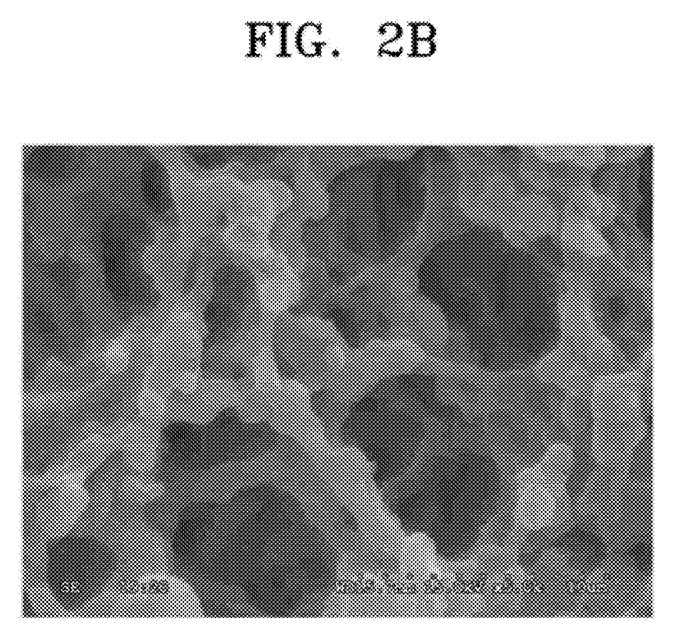

Cellulose nitrate (see FIG. 2B) was used as a porous base material. The pore size of the porous base material was 8 μm, and the thickness thereof was 120 μm.

The porous base material was immersed in the gel mixture for 36 hours so that the gel mixture was impregnated thereinto. The immersion process was repeated to form coating layers respectively having thicknesses of 1, 3, 5 μm, thereby forming an ion-conductive organic/inorganic composite membrane.

Figure 4A:
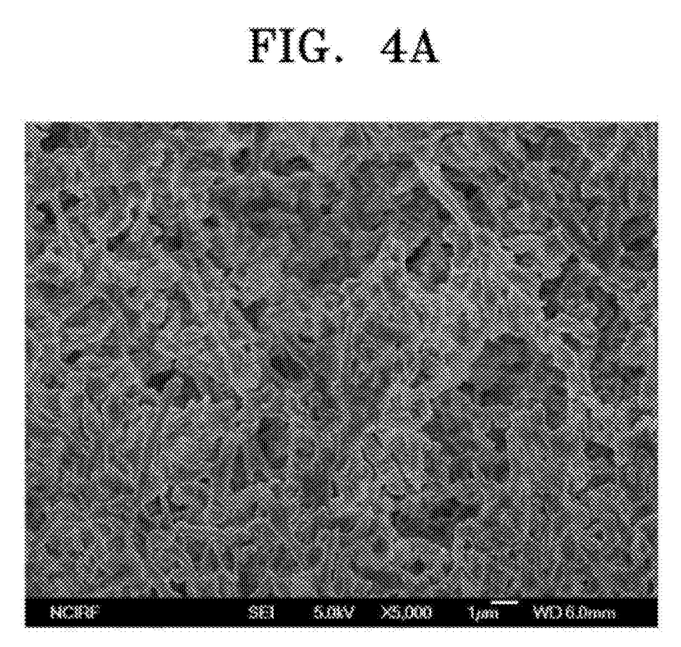
FIGS. 4A and 4B are SEM images illustrating an inner cross-section and a surface of the ion-conductive organic/inorganic composite membrane manufactured in Example 5, respectively.
Figure 4B:
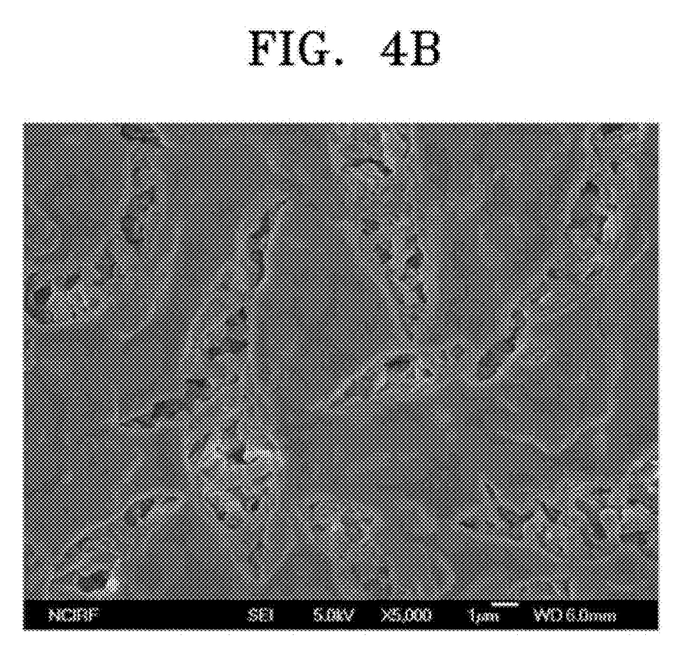

FIGS. 4A and 4B are SEM images illustrating an inner cross-section and a surface of the ion-conductive organic/inorganic composite membrane manufactured in Example 5, respectively.

Figure 5:
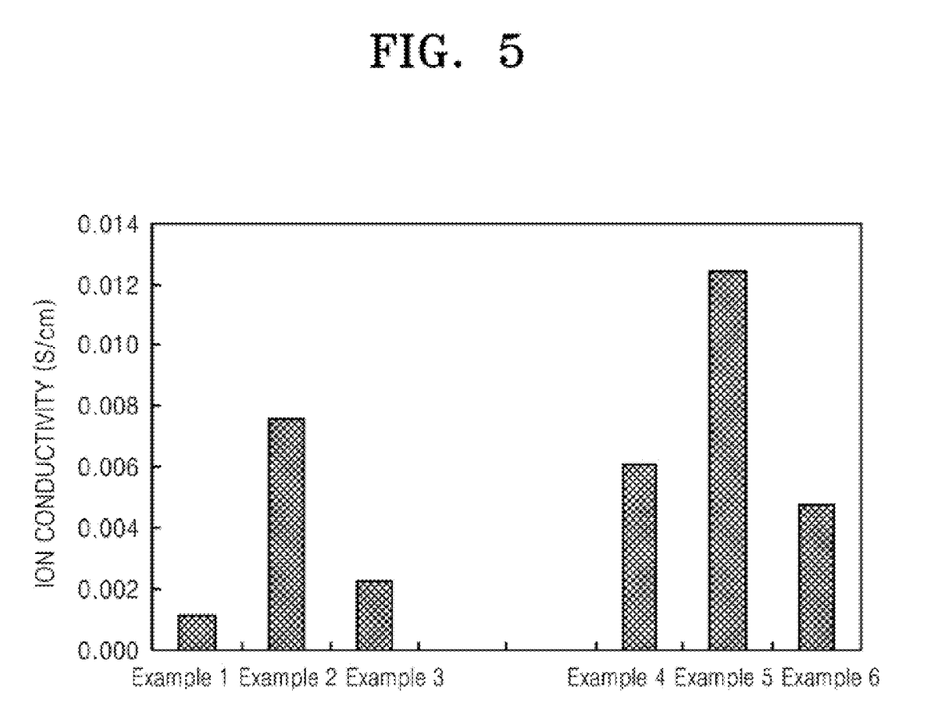
FIG. 5 is a graph of ion conductivity of the ion-conductive organic/inorganic composite membranes manufactured in Examples 1 through 3 and Examples 4 through 6.

FIG. 5 is a graph of ion conductivity measured at 90° C. of the ion-conductive organic/inorganic composite membranes manufactured in Examples 1 through 6. Referring to FIG. 5, the ion conductivities of the ion-conductive membranes according to Examples 1 through 6 are not significantly deteriorated compared with a conventional polymer electrolyte membrane. In addition, the ion-conductive inorganic material impregnated membranes of Examples 4 through 6 generally have higher ion conductivity than the surface-coated composite membranes of Examples 1 through 3.

When the thickness of the coated surface of the ion-conductive inorganic material is 3 μm, the composite membrane has high ion conductivity.

Comparative Example 1

A chamber was separated using a NAFION membrane having a thickness of 150 μm and sealed to prevent the leaking of a liquid. 20 ml of deionized water was filled in one side of the chamber separated by the NAFION membrane, and 20 ml of a 5.0 M methanol solution was filled in the other side of the chamber. The concentration of the methanol solution was measured with time. The results are shown in Table 1.

Examples 7 and 8

Concentrations of the methanol solution were measured in the same manner as in Comparative Example 1 except ion-conductive organic/inorganic composite membranes of Examples 2 and 5 were used instead of the NAFION membrane, respectively. The results are shown in Table 1.

TABLE 1

| Time (minutes) | Example 7 | Examples 8 | Comparative Example 1 |
|---|---|---|---|
| 0 | 5.0 | 5.0 | 5.0 |
| 10 | 5.0 | 5.0 | 4.5 |
| 20 | 4.9 | 4.9 | 4.0 |
| 30 | 4.9 | 4.9 | 3.6 |
| 40 | 4.9 | 4.9 | 3.2 |
| 50 | 4.8 | 4.9 | 2.9 |
| 60 | 4.8 | 4.9 | 2.6 |

Referring to Table 1, the ion exchange organic/inorganic composite membrane of an embodiment of the present invention prevents the crossover of methanol. However, for the conventional NAFION membrane, the methanol concentrations in both sides of the membrane become about equal after 60 minutes due to the methanol crossover.

Example 9

5 g of exfoliated phosphate platelet, 5 g of 1,2-bis(trimethoxysilyl)ethane, and 0.05 g of $Na3PW12O40 \cdot xH2O$ as a polyoxometalate were mixed, and then 0.5 ml of 1.0 M nitric acid was added thereto, thereby forming a gel mixture.

The gel mixture was applied onto a quartz substrate and dried for 24 hours, thereby forming a membrane. The membrane was peeled off from the quartz substrate to form an ion-conductive inorganic membrane, thus forming the membrane.

Example 10

5 g of exfoliated phosphate platelet, 5 g of octyltrimethoxysilane, and 0.05 g of Na3PW12O40·xH2O as a polyoxometalate were mixed, and then 0.5 ml of 1.0 M nitric acid was added thereto, thereby forming a gel mixture.

The gel mixture was applied onto a quartz substrate and dried for 24 hours, thereby forming a membrane. The membrane was exfoliated from the quartz substrate to form an ion-conductive inorganic membrane, thus forming the membrane.

The electrolyte membrane having an ion-conductive inorganic membrane or an ion-conductive organic/inorganic composite membrane effectively prevents crossover of the liquid fuel without the reduction of ion conductivity in a liquid fuel cell, thereby allowing the production of fuel cells having excellent performance.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An ion-conductive organic/inorganic composite membrane comprising:
   a porous base material; and
   an ion-conductive inorganic material comprising:
      phosphate platelets,
      at least one silicon compound selected from the group consisting of silicate, siloxane, and silane, and
      a Keggin-type polyoxometalate and Keggin-type heteropoly acid;
   wherein the phosphate platelets are three-dimensionally connected to each other via the at least one silicon compound selected from the group consisting of silicate, siloxane, and silane,
   wherein the ion-conductive inorganic material is coated on a surface of the porous base material or impregnated throughout the entire porous base material.

2. The ion-conductive organic/inorganic composite membrane of claim 1, wherein the weight ratio of the phosphate platelets to the at least one silicon compound selected from the group consisting of silicate, siloxane, and silane is 1:0.2 through 1:2.5.

3. The ion-conductive organic/inorganic composite membrane of claim 1, wherein the weight ratio of the phosphate platelets to the Keggin-type polyoxometalate and/or the Keggin-type heteropoly acid is 1000:1 through 1:1.

4. The ion-conductive organic/inorganic composite membrane of claim 1, wherein the phosphate platelets are α-zirconium phosphate.

5. The ion-conductive organic/inorganic composite membrane of claim 1, wherein the silicon compound is selected from the group consisting of colloidal silica, PDMS, alkoxysilane, chlorosilane, and a combination thereof.

6. The ion-conductive organic/inorganic composite membrane of claim 1, wherein the silicon compound is selected from the group consisting of tetraethylorthosilicate (TEOS), tetramethylorthosilicate (TMOS), 1,2-bis(trimethoxysilyl)ethane, octyltrimethoxysilane, tetraethyl silicate, tetraisopropyl silicate, tetramethyl silicate, tetramethoxysilane, tetraethoxysilane, tetraisopropoxysilane, propyltrimethoxysilane, ethyltrimethoxysilane, methyltrimethoxysilane, methyltriethoxysilane, aminoalkoxysilane, silicontetrachloride ($SiCl_4$), trichloro(dichloromethyl)silane ($Cl_2CHSiCl_3$), trichloro(hexyl)silane ($CH_3(CH_2)_5SiCl_3$), trichloro(isobutyl)silane (($CH_3)_2CHCH_2SiCl_3$), trichloro(octadecyl)silane ($CH_3(CH_2)_{17}SiCl_3$), trichlorooctylsilane, trichloro(phenethyl)silane ($C_6H_5CH_2CH_2SiCl_3$), trichloro(phenyl)silane, trichloro(propyl)silane, trichloro(methyl)silane, trichloro(chloromethyl)silane, dichloro(dimethyl)silane, isobutyl(trimethoxy)silane, and a combination thereof.

7. The ion-conductive organic/inorganic composite membrane of claim 1, wherein the Keggin-type heteropoly acid is an acid selected from the group consisting of $H_4SiW_{12}O_{40}$, $H_4SiMo_{12}O_{40}$, $H_5SiVMo_{11}O_{40}$, $H_6SiV_2Mo_{10}O_{40}$, $H_7SiV_3Mo_9O_{40}$, $H_3PMo_{12}O_{40}$, $H_3PW_{12}O_{40}$, $(VO)_{1.5}PMo_{12}O_{40}$, $(VO)_{1.5}PW_{12}O_{40}$, $(TiO)_{1.5}PMo_{12}O_{40}$, $H(VO)PMo_{12}O_{40}$, $H(VO)PW_{12}O_{40}$, $H_6PV_3Mo_9O_{40}$, $H_5PV_2Mo_{10}O_{40}$, $H_5PV_2W_{10}O_{40}$, $H_6PV_3W_9O_{40}$, $H_4PV_2Mo_{11}O_{40}$, $H_4PVW_{11}O_{40}$, $RhPMo_{12}O_{40}$, $BiPMo_{12}O_{40}$, $HCrPVMo_{11}O_{40}$, $HBiPVMo_{11}O_{40}$, and a combination thereof.

8. The ion-conductive organic/inorganic composite membrane of claim 7, wherein the Keggin-type polyoxometalate is a salt formed by substituting protons of the Keggin-type heteropoly acid with one of alkali metal ions and ammonium ions.

9. The ion-conductive organic/inorganic composite membrane of claim 1, wherein the thickness of the phosphate platelets ranges from 0.5 to 10 nm.

10. The ion-conductive organic/inorganic composite membrane of claim 1, wherein the thickness of the ion-conductive inorganic material layer formed on the porous base material ranges from 0.2 to 10 μm.

11. The ion-conductive organic/inorganic composite membrane of claim 1, wherein the porous base material is one of polyvinyl alcohol, polyacrylonitrile, phenol resin, teflon-based resin, cellulose-based resin, and nylon resin.

12. The ion-conductive organic/inorganic composite membrane of claim 1, wherein the average diameter of pores in the porous base material ranges from 0.05 to 10 μm.

13. The ion-conductive organic/inorganic composite membrane of claim 1 having a thickness of 50 through 200 μm.

14. A membrane electrode assembly (MEA) comprising a cathode having a catalyst layer and a diffusion layer, an anode having a catalyst layer and a diffusion layer, and an electrolyte membrane disposed between the cathode and the anode, wherein the electrolyte membrane comprises the ion-conductive organic/inorganic composite membrane according to claim 1.

15. A fuel cell comprising a cathode having a catalyst layer and a diffusion layer, an anode having a catalyst layer and a diffusion layer, and an electrolyte membrane disposed between the cathode and the anode, wherein the electrolyte membrane comprises the ion-conductive organic/inorganic composite membrane according to claim 1.

* * * * *